US000001256H

United States Statutory Invention Registration [19]

[11] Reg. Number: H1256

Schabdach et al.

[43] Published: Nov. 2, 1993

[54] SMOKE POT DISPENSER CONTROL CIRCUIT

[75] Inventors: Paul G. Schabdach, Churchville; Scott H. Elwood, Edgewood; Irving F. Barditch, Baltimore; William G. Rouse, Aberdeen, all of Md.

[73] Assignee: The United States of America as reprpesented by the Secretary of the Army, Washington, D.C.

[21] Appl. No.: 926,540

[22] Filed: Aug. 7, 1992

[51] Int. Cl.[5] ..... C06D 3/00

[52] U.S. Cl. ..... 102/334

*Primary Examiner*—Peter A. Nelson

*Attorney, Agent, or Firm*—Anthony T. Lane; Edward Goldberg; Michael C. Sachs

[57] ABSTRACT

A control system is provided for igniting and dispensing a smoke pot for defense of a hulled vehicle. The system utilizes a command circuit located inside the vehicle for using the vehicles power source to select smoke pot operations. A user can select an operation to ignite a desired smoke pot or an operation to ignite and release the smoke pot. Two power lines are arranged from the command circuit inside the vehicle to a control circuit located at the exterior of the hull for operating the smoke pot control system. A minimum number of apertures are required in leading the power lines to the control circuit. The control circuit activates the selected operations of the smoke pots.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

90
+24 VDC
3
1
ARM SWITCH
2
1b
1a
1c
IGNITE SELECT SWITCH
IGNITE + RELEASE
66
1 2 3
4 5 6
7 8 9
* 0 #
6
4
REG
+24VDC
+5VDC
5
1690
OUT
7
18
20
IN
8
62
INSIDE TANK
60
TANK HULL
OUTSIDE TANK
65
64
9
+24VDC
REG
+5VDC
10
202
IN
12
96b
96c
11
74154
16
16a
16b
16c
97b
97c
16x
16x
16x
30
13
1K
14
15
99
19
1K
17a
17
17b
SOLENOID
17a
17
17b
SOLENOID

SMOKE POT DISPENSER CONTROL CIRCUIT

GOVERNMENT INTEREST

This invention may be made, used orlicensed by or for the Government without payment to us of any royalty fees.

FIELD AND BACKGROUND OF THE INVENTION

The present invention relates in general to a vehicle defense system employing a smoke screen and in particular to a new and useful control system for igniting and dispensing a smoke pot.

A common problem found in hulled vehicles is that in adopting new systems for use with the vehicle, the systems often require numerous wires or power lines to operate these systems. For systems that require wiring to be arranged from the inside of the vehicle to the outside of the vehicle's hull, numerous problems have been incurred such as providing a large number of wires through numerous apertures in the hull. These problems drain the overall efficiency of the vehicle as well as tend to increase the cost of manufacturing.

SUMMARY OF THE INVENTION

The present invention is a new and useful control system for igniting and dispensing a smoke pot for providing vehicle defense.

The present invention is a circuit comprising a command circuit located inside a vehicle having a hull which is powered by a vehicle power source, usually a 24 VDC battery. Two DC power lines or wires lead from the interior of the vehicle through an aperture or apertures in the hull to provide power to a control circuit located at the exterior of the vehicle. The control circuit can be contained within a control box mounted on the hull.

A select switch is located within the command circuit which can be a three position double-pole double-throw center off switch where one position designates an ignite operation and another position designates an ignite and release operation. By selecting the desired operation the switch allows for power to be provided along one of the two DC power lines. The first DC power line carries power from the switch to the control circuit for igniting the smoke pot and the second DC power line carries power to the control circuit for releasing an ignited smoke pot.

A key pad having a series of keys or digits is located in the command circuit allowing a user to select the desired smoke pot. An individual key represents a corresponding smoke pot located at the exterior of the hull. When a user selects a desired smoke pot and depresses the appropriate key, an enclosed signal or tone, usually an AC tone, is sent along the first DC power line to a decoder located within the control circuit. The decoder decodes the tone and activates a relay driver circuit which in turn activates the selected smoke pot. For every smoke pot on the vehicle, there is a corresponding relay driver circuit. The relay driver circuit serves as a power link to the desired smoke pot and upon activation form the decoder, the relay driver circuit channels power form the first and/or second DC power lines to the appropriate smoke pot depending on the selected operation at the selection switch. Thus, when the user has selected the ignite operation at the selection switch along with the selection of a desired pot at the key pad, the relay driver circuit corresponding to the selected smoke pot will draw the power from the first DC power line to an ignite mechanism or igniter on the smoke pot which causes the smoke pot to activate and provide a smoke screen. When the user selects the ignite and release operation at the select switch along with the selection of a desired smoke pot at the key pad, the relay driver circuit corresponding to this smoke pot draws power from both the first and second DC power lines and provides it to the igniter of the smoke pot and to a release mechanism of the smoke pot which releases or dispenses an ignited smoke pot from the vehicle.

It is an object of the present invention to provide a control system for igniting and dispensing a smoke pot that is easy to use and cost efficient.

Another object of the present invention is to provide a control system that utilizes a minimum amount of wires or power lines.

A further object of the present invention is to provide a control system that employs a minimum amount of apertures in a vehicle hull.

Another object of the present invention is to provide a control system that allows a user to select the option to ignite a smoke pot or to ignite and release a smoke pot.

It is another object of the present invention to provide a control system that can accommodate any number of smoke pots.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENT

Figure 1:
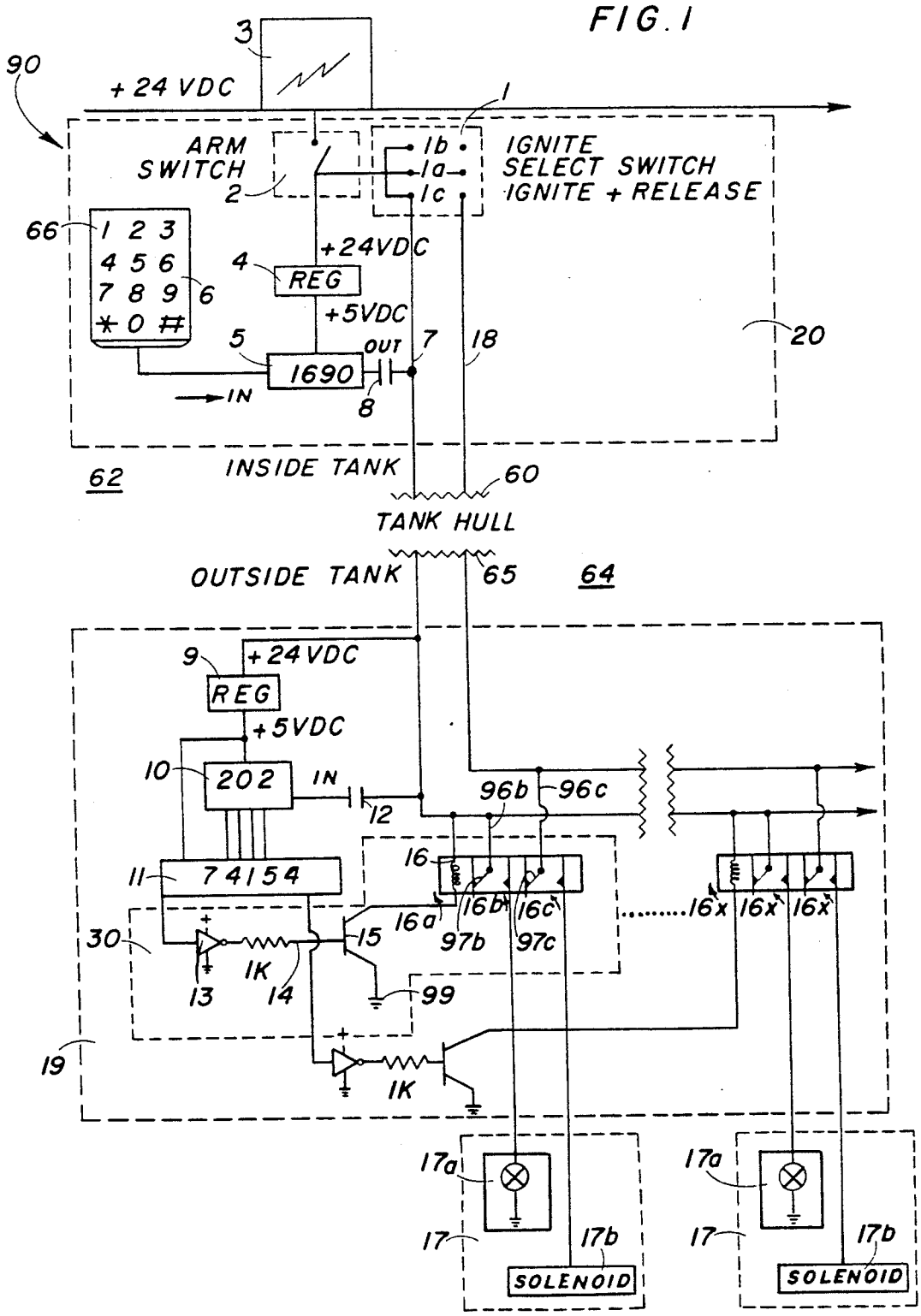
FIG. 1 is a schematic of the present invention.

In FIG. 1, the control system generally designated 90 is for a new vehicle defense system in which a plurality of smoke pots 17 are activated and produce a smoke screen which obscures the vehicle. Each smoke pot 17 may be ignited and kept on the vehicle or ignited and released through use of the control system 90.

The control system 90 can accommodate any number of smoke pots 17. However it can be desirable to utilize ten smoke pots 17.

A command circuit 20 is located at an inner side 62 of a hull 60. A power source 3 such as a 24 VDC battery can be utilized to power the system 90. The command circuit 20 draws power from the power source 3 wherein a select switch 1 which can be in the form of a three position double pole, double throw, center off switch having an off position 1*a* preferably located in the center of the select switch 1. The select switch 1 can be moved from the off position 1*a* to an ignite position 1*b* or an ignite and release position 1*c*.

An arm switch 2 which can be in the form of a single pole, single throw and when closed allows the power to flow from the power source 3 to the select switch 1 and to a regulator 4. The regulator 4 drops the voltage, preferably to five volts, which in turn supplies the power to a tone encoder chip 5, preferably a 1690 tone encoder chip.

A key pad 6 is directly linked to the tone encoder chip 5 such that when a key 66, representing a corresponding smoke pot 17, is depressed, the tone encoder chip 5 outputs a distinct tone representing a separate key 66 and corresponding a smoke pot 17.

The tones, preferably AC tones, outputted by the tone encoder chip 5 are sent to a fist DC power line 7 through a coupling capacitor 8. The first DC power line 7 originates form the select switch 1 of the command circuit 20 and extends to the control circuit 19 located at an exterior side 64 of the hull 60. The first DC power line 7 is inserted through an aperture 65 in the hull 60. The control circuit 19 can be in the form of a control box mounted to the exterior 64 of the hull 60.

A second DC power line 18 originates at the select switch 1 of the command circuit 20 and extends through the aperture 65 of the hull 60 to the control circuit 19.

When the select switch 1 is moved to the ignite position 1*b*, the power is sent along the first DC power line 7 to the control circuit 19 at the exterior side 64 of the hull 60. When the select switch 1 is positioned at the ignite and release position 1*c*, power is sent along both the first DC power line 7 and the second DC power line 18 to the control circuit 19.

Power from the DC power line 7 is picked up by an outside regulator 9 located in the control circuit 19 at the exterior 64 of the hull 60. The outside regulator 9 provides power to a tone decoder chip 10 and a decoder 11 preferably a 74154 4 line to 16 line decoder. The tone decoder chip 10 picks up the selected tones originated from the tone encoder chip 5 through an outside coupling capacitor 12. The tone decoder chip 10 decodes the tones and outputs the selected key 66 entered at the key pad 6 representing a selected smoke pot 17. This output is preferably in the form of hexadecimal output.

The decoder 11 takes the hexadecimal output from the tone decoder chip 10 and outputs the code as 0 through 15 on its output pins (11-1 through 11-16) wherein larger systems would have several of these IC chips.

This output from the decoder 11 goes to a relay driver circuit 30 comprising an invertor 13, preferably a 7404 invertor, a 1K resistor 14 and a transistor 15, preferably a 2n2222 transistor. When the normally high output of the decoder 11 goes low for the selected key 66, the output is inverted through the invertor 13 causing the output to go from low to high through the 1K resister 14 in turn operating the transistor 15. A relay 16 located in the control circuit 19 comprises a coil 16*a* which is connected to the first DC power line 7 providing a path to a ground 99 for the power through the transistor 15. A first relay contact 16*b* of the relay 16 provides power to an igniter 17*a* of the smoke pot 17. The first relay contact 16*b* has an first upper portion 96*b* connected to the first DC power line 7 and the relay 16. A first bridging portion 97*b* is connected to the first upper portion 96*b* and remains in an open position until activated by the relay driver circuit 30. When activated the first bridging portion 97*b* closes and engages the first relay contact 16*b* allowing the power to travel along the first relay contact 16*b* and activate the igniter 17*a* to ignite smoke pot 17.

A second relay contact 16*c* of the relay 16 provides power to a release mechanism 17*b* of the smoke pot 17. The second relay contact 16*c* has a second upper portion 96*c* connected to the second DC power line 18 and the relay 16. A second bridging portion 97*c* is connected to the second upper portion 96*c* and remains in an open position until activated by the relay driver circuit 30. When activated the second bridging portion 97*c* closes and engages the second relay contact 16*c* allowing the power to travel along the second relay contact 16*c* and activate the release mechanism 17*b* of the smoke pot 17 to release the smoke pot 17 from the hull 60.

Thus, when select switch 1 is positioned in the ignite position 1*b* power is provided along the first DC power line 7 through the first relay contact 16*b* to the igniter 17*a* igniting the smoke pot 17. When the select switch 1 is positioned in the ignite and release position 1*c*, power is provided along the first DC power line as mentioned above and along the second DC power line 18 through the second relay contact 16*c* to the release mechanism 17*b* allowing the smoke pot 17 has been ignited through power provided through the first DC power line 7, to be released from the exterior 64 of the hull 60 by the release mechanism 17*b*.

Although not shown in the figure, a third wire may be passed through the hull to serve as a ground.

While a specific embodiment of the invention has been shown and described in detail to illustrate the application of the principles of the invention, it will be understood that the invention may be embodied otherwise without departing from such principles.

What is claimed is:

1. A control system for igniting and releasing a smoke pot on a vehicle having a hull and a power source, the hull having an aperture therethrough, the control system comprising:

a command circuit located at an inner side of the hull, the command circuit for emitting a plurality of signals by drawing power from the power source;

a control circuit located at an exterior side of the hull, the control circuit for receiving the signals emitted by the command circuit and controlling the smoke pot, the smoke pot located at the exterior of the hull, the smoke pot having an igniter and a release mechanism, the igniter for igniting the smoke pot, the release mechanism for releasing the smoke pot from the exterior side of the hull;

a selection switch located within the command circuit, the selection switch having a first position and a second position, the first position for sending a first signal along a first power line, the first signal to ignite the smoke pot, the first power line connected to the command circuit at one end and extending through the aperture of the hull and connected to the control circuit at an opposite end for carrying the first signal to the control circuit, the second position for sending a second signal along a second power line, the second signal to ignite and release the smoke pot, the second power line connected to the command circuit at one end and extending through the aperture of the hull and connected to the control circuit at an opposite end for carrying the second signal to the control circuit;

a pot selection mechanism located within the command circuit and connected to the first power line for sending a pot selection signal to the control circuit along the first power line, the pot selection signal for designating a selected smoke pot for activation at the exterior side of the hull;

a pot selection receiver located within the control circuit and connected to the first power line for receiving the pot selection signal sent by the pot selection mechanism along the first power line and activating the selected smoke pot;

a plurality of relay circuits located within the control circuit and connected to the pot selection receiver and the first and second power lines, each relay circuit connected to a corresponding smoke pot by a first relay contact and a second relay contact, the first relay contact extending from each relay circuit to the igniter of the corresponding smoke pot, the second relay contact extending from each relay circuit to the release mechanism of the corresponding smoke pot, the first and second relay contacts being oriented in an open position at each relay circuit, the first relay contact being activated and closed when the selection switch is moved to the first position sending the first signal along the first power line to the relay circuit allowing the first signal to reach the igniter causing the igniter to ignite the smoke pot, the second relay contact being activated and closed when the selection switch is moved to the second position, the first signal is sent along the first power line and the second signal is sent along the second power line to the relay circuit so that both the first and second relay contacts close allowing both the first signal to reach the igniter causing the igniter to ignite the smoke pot and the second signal to reach the release mechanism causing the smoke pot to be released from the exterior side of the hull, the relay circuits being activated to relay the first and second signals received from the first and second power lines to the selected smoke pot upon command by the pot selection receiver along the first and second contacts to the igniter and the release mechanism of the selected smoke pot.

2. The control system according to claim 1, wherein the pot selection mechanism is a key pad having a plurality of keys representing a corresponding smoke pot.

3. The control system according to claim 3, wherein each key of the key pad emits a distinct tone when depressed.

4. The control system according to claim 4, wherein the pot selection receiver comprises a tone decoder chip which decodes the tone and activates the relay circuit which corresponds to the tone.

5. The control system according to claim 1, wherein the control circuit is contained within a control box mounted to the exterior side of the hull.

6. The control system according to claim 1, wherein a ground line connected at one end to the command circuit is passed through the aperture of the hull and is connected to the exterior side of the hull at an opposite end of the ground line to serve as a ground.

* * * * *